US012591646B2

(12) United States Patent
Ding et al.

(10) Patent No.: US 12,591,646 B2
(45) Date of Patent: Mar. 31, 2026

(54) MULTIMODAL BIOMETRIC FUSION BASED AUTHENTICATION

(71) Applicant: THALES DIS FRANCE SAS, Meudon (FR)

(72) Inventors: Yi Ding, Irvine, CA (US); Daniel Asraf, Seal Beach, CA (US); Jing Jim Wang, Arcadia, CA (US)

(73) Assignee: THALES DIS FRANCE SAS, Meudon (FR)

( * ) Notice: Subject to any disclaimer, the term of this patent is extended or adjusted under 35 U.S.C. 154(b) by 375 days.

(21) Appl. No.: 18/034,433

(22) PCT Filed: Oct. 29, 2021

(86) PCT No.: PCT/EP2021/080212
§ 371 (c)(1),
(2) Date: Apr. 28, 2023

(87) PCT Pub. No.: WO2022/090515
PCT Pub. Date: May 5, 2022

(65) Prior Publication Data
US 2023/0401302 A1 Dec. 14, 2023

(30) Foreign Application Priority Data

Oct. 30, 2020 (EP) ..................................... 20306302

(51) Int. Cl.
*G06F 21/32* (2013.01)
(52) U.S. Cl.
CPC ..................................... *G06F 21/32* (2013.01)

(58) Field of Classification Search
CPC ...... G06F 21/32; G06V 10/811; G06V 40/70; G06V 40/155; G06V 40/00; G06V 40/15;
(Continued)

(56) References Cited

U.S. PATENT DOCUMENTS 10,936,709 B2 * 3/2021 Kim ........................ G06F 21/32
2010/0228692 A1 * 9/2010 Guralnik .............. G06V 10/768
706/54

(Continued)

FOREIGN PATENT DOCUMENTS

GB 2468402 A 9/2010

OTHER PUBLICATIONS

International Search Report and Written Opinion mailed on Feb. 8, 2022 for corresponding International Application PCT/UEP2021/080212 (15 pages).

(Continued)

*Primary Examiner* — Juan M Guillermety

(57) ABSTRACT

Provided is a method for recognizing an individual by fusing a first match result generated by a first single-modal biometric recognition system of a first biometric modality and a second match result generated by at least one second single-modal biometric recognition system of a second biometric modality into a fused match result. Machine leaning based on training of retrieved data is performed to obtain optimized parameters meeting a target performance metric. Parameters of a fusion model are updated with the optimized parameters in a database, which is then applied to match results to recognize the individual. Other embodiments disclosed.

18 Claims, 2 Drawing Sheets

(58) Field of Classification Search
CPC ........... G06V 40/60; E05Y 2400/8505; A61M
2205/609; F41A 17/066; G06Q 20/40145;
G08C 2201/61; G05B 2219/24162; G16Y
20/40
See application file for complete search history.

(56) References Cited

U.S. PATENT DOCUMENTS

| 2011/0221567 | A1* | 9/2011 | Lehnert | ................. | G06V 40/10 |
| | | | | | 340/5.82 |
| 2021/0264003 | A1* | 8/2021 | Solano | ................. | G06F 21/316 |

OTHER PUBLICATIONS

Wang Yet al: "Combining Face and Iris Biometrics for Identity Verification", Audio- and Video-Based Biometric Person Authentication, xx, xx, Jan. 1, 2003 (Jan. 1, 2003), pp. 805-813, XP009060032, Abstract—section 4.1-4.2—section 3—section 3.1 -3.3.
Jain et al: "Score normalization in multimodal biometric systems", Pattern Recognition, Elsevier, GB, vol. 38, No. 12, Dec. 1, 2005 (Dec. 1, 2005), pp. 2270-2285, XP005081172, ISSN: 0031-3203, DOI: 10.1016/J.PATCOG.2005.01.012—section 3.1.

* cited by examiner

Fig. 3

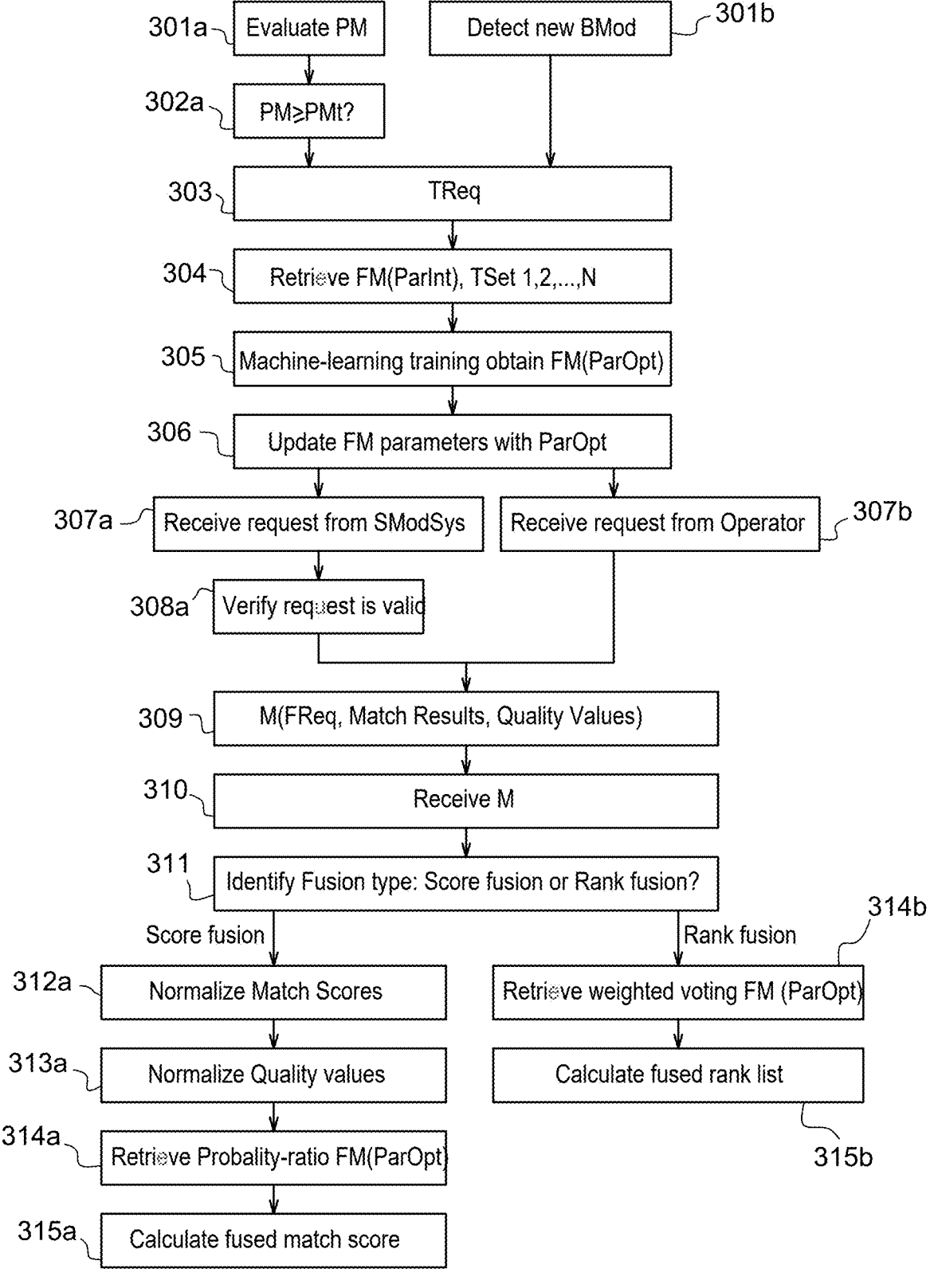

301a — Evaluate PM

301b — Detect new BMod

302a — PM≥PMt?

303 — TReq

304 — Retrieve FM(ParInt), TSet 1,2,...,N

305 — Machine-learning training obtain FM(ParOpt)

306 — Update FM parameters with ParOpt

307a — Receive request from SModSys

307b — Receive request from Operator

308a — Verify request is valid

309 — M(FReq, Match Results, Quality Values)

310 — Receive M

311 — Identify Fusion type: Score fusion or Rank fusion?

Score fusion

Rank fusion

314b

312a — Normalize Match Scores

Retrieve weighted voting FM (ParOpt)

313a — Normalize Quality values

Calculate fused rank list

314a — Retrieve Probality-ratio FM(ParOpt)

315b

315a — Calculate fused match score

MULTIMODAL BIOMETRIC FUSION BASED AUTHENTICATION

TECHNICAL FIELD

The present invention relates generally to a multimodal biometric fusion method and system, and more particularly to an adaptive multimodal biometric fusion method and system that is adapted to extend to new modalities.

BACKGROUND

Biometrics refers to technologies used to measure human physical or behavioral characteristics such as fingerprints, iris, face, retina, hand geometry, voice or signatures and using such measures to detect and recognize individuals. Traditionally, in most of the biometric systems, only one single biometric modality is employed, e.g., Automatic Fingerprint Identification Systems, Live Face Identification Systems, etc. Unfortunately, biometric systems with single modality present several limitations which in some cases make the performance insufficient for the related single modality system in terms of accuracy, universality, distinctiveness, acceptability. In order to overcome such kinds of limitations, methods of combining multiple biometric modalities have attracted increasing attentions for improving the ability of systems to handle poor quality and incomplete data, achieve scalability to manage huge databases of users, ensure interoperability and protect user privacy against attacks.

However, due to the incompatibility between different biometric modalities, there are quite a few technical issues for the multimodal fusion, for example, when to fuse, what to fuse, and how to fuse from different biometric modalities are three major challenges in the multimodal biometric fusion. In addition, the current solutions for multimodal fusion are somehow vulnerable under dynamic environment, or in the situation of adding new modalities. So, it is highly desirable to build multimodal biometric fusion systems that are accurate, adaptive, robust, and extendable.

This invention relates to a novel system and methods of multimodal biometric fusion. More specifically, a multimodal biometric system architecture is proposed, which includes four major modules, the fusion controller module that provides the interface with the application layer and all other modules, the fusion engine module that process the fusion requests, the training engine that provides optimal parameters for the fusion engine module, and finally the benchmark engine module that is able to evaluate the fusion system performance periodically. In addition to the system architecture, novel fusion methods are also proposed in this invention, which include score normalization method that converts matching scores from different modalities into unified scale levels, score fusion method that combines matching scores from different modalities into one score/ decision, and the ranking fusion method that combines multiple ranking lists from different modalities into a single one in order to support the biometric identification.

With the help of this invention, biometric information from multiple modalities are combined at different levels based upon dynamic rule-adaption methodologies, which provides the advantage of fusion being expandable to additional modalities, resilient to input noise, and adaptable to changes in input data in an automated fashion. The proposed methods incorporate innovative Score/Rank-level fusion strategies, coupled with advanced machine-learning efficiencies to optimize fusion performance. In addition, the fusion solution is extendable to support new modalities, new matchers, and dissimilar biometric vendors.

SUMMARY

In order to solve the above mentioned technical problems, the present invention provides an adaptive multimodal biometric fusion method and system that is adapted to extend to new modalities.

According to the invention, there is a method for recognizing an individual by fusing a first match result generated by a first single-modal biometric recognition system of a first biometric modality and a second match result generated by at least one second single-modal biometric recognition system of a second biometric modality into a fused match result, the method being suitable to be implemented by a multimodal biometric fusion system and comprising:

by a training engine of the fusion system:

receiving a training request for optimizing parameters of a fusion model to achieve a target performance metric;

retrieving, from a database of the fusion system, the fusion model, initial parameters of the fusion model, a training sample set associated with the first biometric modality and a training sample set associated with the at least one second biometric modality;

performing a machine leaning based training on the retrieved data to obtain optimized parameters meeting the target performance metric;

updating the parameters of the fusion model with the optimized parameters in the database;

by a fusion engine of the fusion system:

receiving, from a fusion controller of the fusion system, a message comprising a fusion request, the first single-modal biometric match result, and the at least one second single-modal biometric match result;

obtaining from the message the first match result and the at least one second match result;

retrieving, from the database, the optimized parameters of the fusion model;

applying the fusion model, with the optimized parameters, to the first match result and the at least one second match result to calculate a fused match result for recognizing the individual.

In a particular example of the invention, the first match result and the at least one second match result are the matching scores, the matching score being a score obtained by matching biometric data captured from the individual and biometric data enrolled from a certain candidate and stored in the database.

In a particular example of the invention, the method further comprises:

before applying the fusion model, for each of the first single-modal biometric matching score and the at least one second single-modal biometric matching score, applying a tanh-estimator to a ratio of a difference between the original single-modal biometric matching score and a mean of all genuine scores of a training sample set to the standard deviation of all the genuine scores of the training sample set to calculate a normalized matching score, the training sample set having the same biometric modality as the original single-modal biometric matching score;

wherein the first normalized matching score and the at least one second normalized matching score instead of the original matching scores are used to calculate the fused match result.

In a particular example of the invention, the message further comprises a first quality value associated with the first single-modal biometric matching score, at least one second quality value respectively associated with the at least one second single-modal biometric matching score;

wherein the fused match result is calculated by further taking into account the quality values.

In a particular example of the invention, the method further comprises:

before applying the fusion model, for each of the first quality value and the at least one second quality value, calculating a normalized quality value by applying a Min-Max normalization approach to the original quality value, the minimum and the maximum of all original quality values;

wherein normalized quality values instead of the original quality values are used to calculate the fused match result.

In a particular example of the invention, wherein the fusion model applied by the fusion engine is a probability-ratio based model which calculates a ratio of a probability that the individual matches a candidate, called genuine probability, to a probability that the individual is not match a candidate, called imposter probability, the probability ratio being the fused match result;

wherein the genuine probability and the imposter probability are respectively calculated according to a first finite Gaussian Mixture Model and a second finite Gaussian Mixture Model by taking into account:

the single-modal biometric matching scores and quality values as variables;

a number of mixture components of the corresponding finite Gaussian Mixture Model, a weight of each mixture component, a vector of means of scores of the training sample sets for each mixture component, a covariance matrix of scores obtained from the training sample sets for each mixture component, as parameters.

In a particular example of the invention, wherein the parameters of the probability-ratio based model are leaned by the training engine using a Component-Wise EM for Mixture (CEMM) algorithm from the training sample sets.

In a particular example of the invention, wherein the first match result and the at least one second match result are rank lists, the rank list being a list of ranked candidates having biometric data stored in the database and compared with the biometric data captured from the individual.

In a particular example of the invention, wherein the fusion model applied by the fusion engine is a weighted voting model which calculates, for each candidate of the rank lists, a total votes from the first and the at least one second biometric modalities, and obtains a fused rank list based on the total votes of each candidate, wherein the biometric modalities have voting weights as parameters of the fusion model.

In a particular example of the invention, wherein the parameters of the weighted voting model are leaned by the training engine using a logistic regression algorithm from the training sample sets.

In a particular example of the invention, wherein the message is generated and sent by the fusion controller in response to a request comprising the first match result received by the fusion controller from the first single-modal biometric recognition system via a telecommunication network, and wherein the fused match result is sent by the fusion controller to the first single-modal biometric recognition system via the telecommunication network.

In a particular example of the invention, the method further comprises:

before sending the message to the fusion engine, verifying by the fusion controller whether the request from the first single-modal biometric recognition system is valid;

generating the message if the request is valid.

In a particular example of the invention, wherein the message is generated and sent by the fusion controller in response to an instruction received by the fusion controller from an operator.

In a particular example of the invention, the method further comprises:

evaluating by an evaluation engine of the fusion system a performance metric based on a set of multimodal biometric fused match results that have been generated by the fusion engine during a period.

In a particular example of the invention, the method further comprises:

comparing the evaluated performance metric with a target performance metric to trigger the sending of the training request to the training engine.

In a particular example of the invention, the method further comprises:

displaying the evaluated performance metric and/or historical performance metrics on a screen of the fusion system for an operator to review.

In a particular example of the invention, the method further comprises:

detecting a single-modal biometric recognition system of a new biometric modality and/or a new vendor to trigger the sending of the training request to the training engine.

In a particular example of the invention, wherein the performance metric is chosen from one or more of: a false acceptance rate FAR, a false reject rate FRR, and a receiver operating characteristic curve ROC.

In a particular example of the invention, a multimodal biometric fusion system (FSys) comprises a processor adapted to perform the steps of the method according to the invention. In a particular example of the invention, a computer program comprises instructions which, when the program is executed by a processor of the multimodal biometric fusion system, cause the system to carry out the steps of the method according to the invention.

The foregoing has outlined rather generally the features of one or more embodiments of the present invention in order that the detailed description of the present invention that follows may be better understood. Additional features and advantages of the present invention will be described hereinafter which may form the subject of the claims of the present invention.

The advantages and features of the system and the computer program according to the embodiments of the present invention are the same with those of the above described method and will not be repeated here.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 3 illustrates a flowchart of a method performed by the multimodal biometric fusion system of FIG. 2 in accordance with an embodiment of the present invention.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
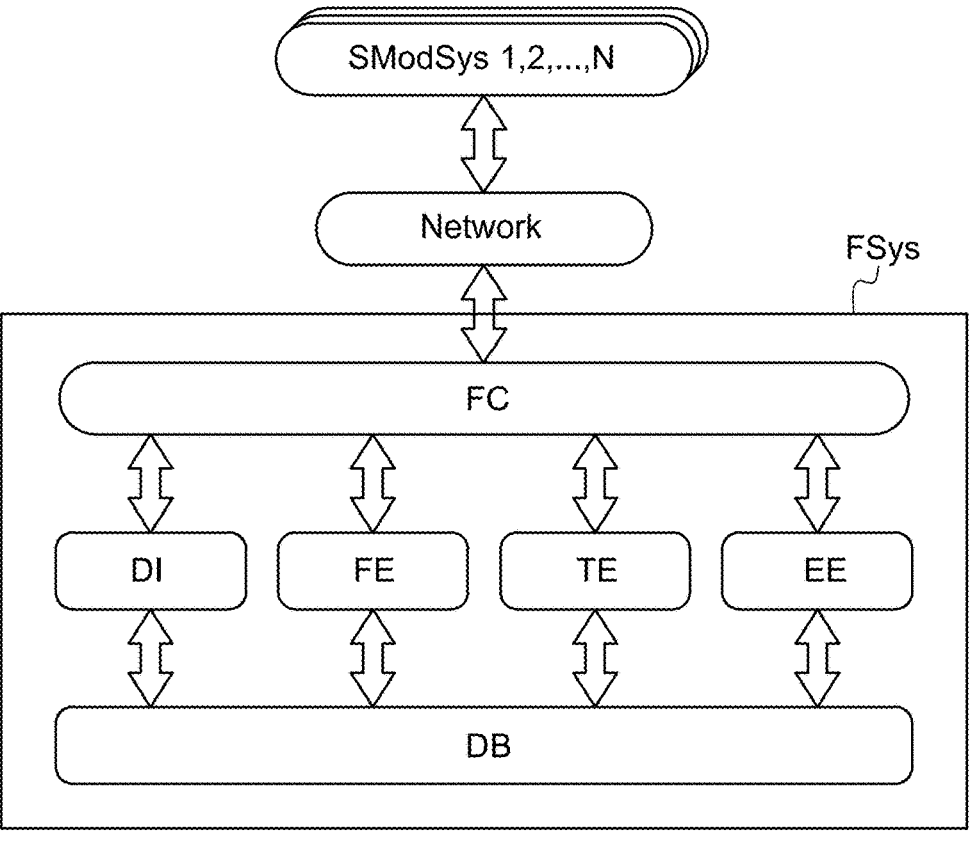
FIG. 1 illustrates an architecture for a multimodal biometric fusion system to communicate with multiple single-model biometric recognition systems and fuse match results received from the single-model biometric recognition systems, in accordance with an embodiment of the present invention.

FIG. 1 depicts an architecture wherein a multimodal biometric fusion system FSys communicates with a plurality of single-modal biometric recognition systems SModSys1, SModSys1, . . . , SModSysN via a telecommunication network. The network is referred but not limited to Ethernet, Internet, WIFI, LTE network, 5G network, VPN, and so on.

The single-modal biometric recognition system is a combination of software and hardware elements (e.g., a biometric data capturing terminal, an associated computing device for generate match results based on captured biometric data and prestored biometric data). The single-modal biometric recognition system may also be called an application.

The plurality of single-modal biometric recognition systems are adapted to capture biometric data of different modalities, e.g., fingerprint, face, iris, and etc., evaluate qualities for the captured data, extract biometric features from the data, generate match results between the probe biometric data (i.e., the newly captured data) and gallery biometric data (i.e., which was previously enrolled from a lot of individuals), and send/receive information (e.g., fusion request, generated match results, qualities associated with the match results, fused match results) to/from the multimodal biometric fusion system.

The multimodal biometric fusion system comprises a fusion engine FE and a training engine TE, as essential components. The training engine is responsible for running machine learning based trainings to learn or optimize parameters of fusion models to be used by the fusion engine. The fusion engine is responsible for fusing match results (e.g., match scores, rank lists) generated and sent by the multiple single-modal biometric recognition systems into a final single fused match result (e.g., a fused match score, a fused rank list). The multimodal biometric fusion system may access, locally or via a network, a database DB which stores data such as the match results received from the single-modal systems, the fusion models and the corresponding parameters, training samples (e.g., pairs of biometric feature templates of a same individual for different individuals) of different modalities, the fused match results, system performance metrics (e.g., False Acceptance Rate FAR, False Reject Rate FRR, Receiver Operating characteristic curves ROC), etc.

Optionally, the multimodal biometric fusion system fusion further comprises a fusion controller FC, an evaluation engine EE, and a display interface DI which will be described in more details hereinafter by referring to FIG. 2. The modules of the fusion system, e.g., the fusion controller FC, the fusion engine FE, the training engine TE, the evaluation engine EE, the database DB, the display interface DI, may be implemented in standalone entities having data storage and computing capacitances that may communicate with each other via wired or wireless communications. Alternatively, the modules of the fusion system may be implemented in the same data processing entity. Alternatively, some of the modules may be implemented in a same data processing entity and the others may be implemented as standalone data processing entities.

Figure 2:
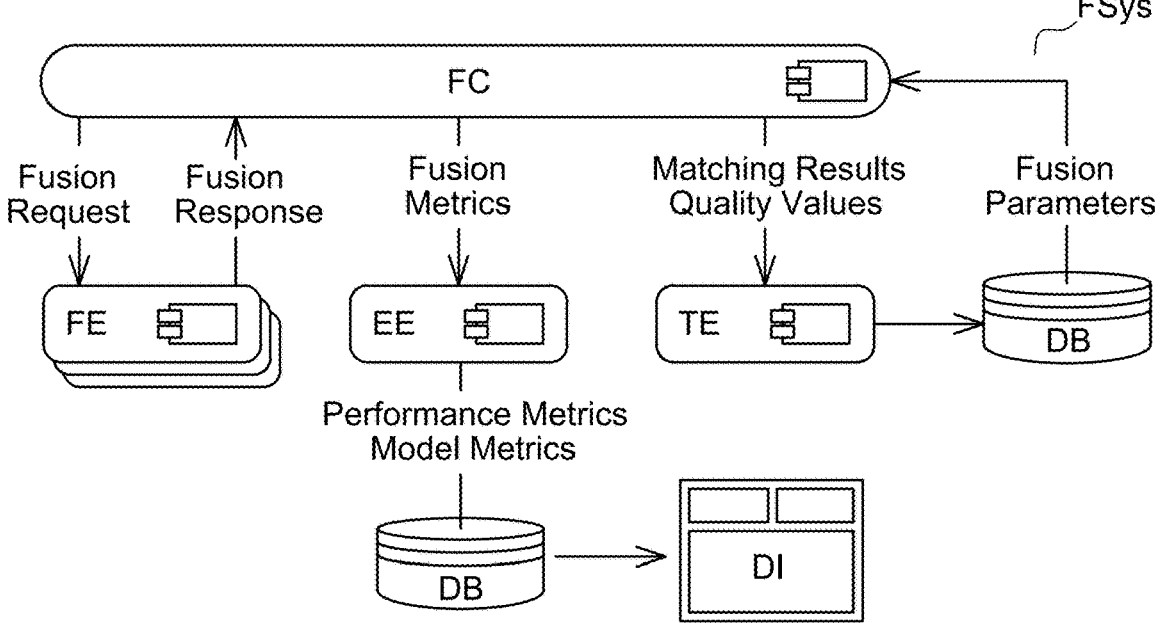
FIG. 2 represents a hardware configuration of a multimodal biometric fusion system for practicing the principles of the present invention in accordance with an embodiment of the present invention.

FIG. 2 illustrates a hardware configuration of the multimodal biometric fusion system. The fusion controller may play as an interface between the single-modal biometric recognition systems and all modules of the fusion system. The fusion controller may be also responsible for load balancing if there are multiple instances of modules running.

The fusion controller may interface with the fusion engine to pass fusion requests and receive fusion responses. The fusion request may contain the latest fusion configuration parameters (e.g., modality weights, quality weights, and modal parameters etc.) that are retrieved from the database populated by the training engine.

The fusion controller may also communicate with the evaluation engine to pass/receive fusion performance metrics, and interface with the training engine to periodically (configurable) pass fused match results to the training engine and associated quality and match score/rank metrics.

The fusion engine provides the service of multimodal biometric fusion using a multi-level (e.g., score-level, rank-level) fusion strategy. The fusion engine may be controlled by the fusion controller. When the fusion requests are received, it retrieves the fusion parameters of fusion rules (or fusion models) and then applies the fusion rules to multiple single-modal matching scores (or ranks) in order to generate the fusion result for the requestors. The requestor may be a single-modal biometric recognition system, or a human operator.

The training engine is adapted to retrieve biometric data patterns (e.g., training sample sets of different modalities), feature distribution (e.g., fusion rules or models), and system preference (e.g., empirical parameters), then refine the parameters of the fusion models used by the fusion engine with machine learning approaches.

The training engine may be adapted to continuously or periodically retrieve data resulted from operations of other modules of the fusion system, e.g., raw biometric data, biometric features, match scores, image qualities, and etc., from the database, and evaluate if an adaptation of the rules (e.g., parameters of the fusion models) is suggested. When triggered by an operator or pre-set system thresholds (e.g., target performance metrics), the training engine is able to train new fusion parameters. The updated fusion parameters are maintained in the database, which is accessible by the fusion engine each time a fusion request is received.

The evaluation engine is responsible for evaluating system performance in real-time or periodically. The evaluation engine is also called a benchmark engine. As the fusion system keeps receiving new biometric data, and different user settings are normally applied in different single-modal biometric recognition systems, the performance (e.g., FAR, FRR, ROC, etc.) of the fusion system may change gradually in a long-term run or vary in different scenarios. With the help of the evaluation engine, users (e.g. operator) are able to evaluate the system performance automatically and know whether the system needs to be tuned.

The display interface is able to display the current system status (e.g., system performance metrics like FAR, FRR, ROC, etc.), history records, as well as the future performance prediction. The display interface may be called a dashboard reporting interface. Notifications of system performance alerts may also be sent to the users through emails, SMS, or phone calls.

The one of more database of the fusion system are adapted to store all the necessary data for the fusion system, including biometric data with corresponding features, match scores, rank lists, fusion models with their parameters, and system settings.

FIG. 3 illustrates an exemplary process flow of a method for recognizing an individual by fusing match results generated and sent by multiple single-modal biometric recognition systems. The method is suitable to be performed by the multimodal biometric fusion system shown in FIG. 1 and FIG. 2.

Generally, the method mainly comprises a training phase and a fusion phase. The training phase starts from step 301a (or 301b) to step 306, and the fusion phase starts from step 307a (or 307b) to step 315a (or 315b).

We first turn to the training phase which is performed by the training engine TE to refine the parameters of the fusion models that are employed by the fusion engine, based on machine learning based methods. There are two alternative working modes of the training engine, one is offline training, and the other is online training.

In the offline training mode, the training engine TE may be triggered 301b by an operator though the fusion controller FC or automatically by the fusion controller FC when detecting one of the following: 1). Massive new training samples that may lead to better system performance are available; 2). New biometric modalities BMod are added to the fusion system; 3). New system performance metrics including speed and accuracy are enforced; 4). Any existing system modules, e.g., feature extractors or matchers, are replaced (e.g., single-modal biometric recognition systems of new vendors).

When the offline training is triggered by the fusion controller FC instructed by the operator, the training engine TE first receives 303 a training request TReq indicating a target fusion model FM and target performance metrics (e.g., FAR, FRR, ROC, etc.) from the fusion controller APIs.

The training engine TE retrieves 304 training sample (both positive and negative) sets TSet1, TSet2, . . . , TSetN of multiple biometric modalities comprising the new modality, the target fusion model FM and its initial parameters Parint from the database DB.

The training engine TE performs 305 a machine leaning based training on the retrieved data to obtain trained (or optimized) parameters ParOpt meeting the target performance metrics.

The training engine TE updates 306 the parameters (e.g. Parint) of the fusion model FM with the optimized parameters ParOpt in the database DB. The optimized parameters of the fusion model will be returned to the fusion engine for use, as to be further explained hereinafter.

Alternatively, in the online training mode, the training engine follows a similar process to the above-mentioned steps, except that the sending of the training request TReq is triggered automatically by the evaluation engine EE that evaluates 301a the system performance metrics PM (e.g., FAR, FRR, ROC) in real-time or periodically. The evaluation engine EE sends 303 the training request TReq to the training engine TE if the evaluation engine EE detects 302a that the evaluated performance metrics PM do not meet pre-set thresholds, target performance metrics PMt.

The optimized fusion model parameters ParOpt may be updated simultaneously when the training is done in the database DB or locally in the training engine TE.

Now we turn to the fusion phase.

In a first example, the fusion phase starts when the fusion controller FC receives 307 a fusion request from at least one single-modal biometric recognition systems, for example a fingerprint recognition system SModSys1, a facial recognition system SModSys2, via the telecommunication between SModSys1, SModSys2 and the fusion system FSys. N single-modal biometric recognition systems of different biometric modalities BMod1, BMod2, . . . , BModN may send requests to the fusion system.

If the fusion controller FC receives the fusion request from only one single-modal biometric recognition system, it is adapted to collect match results of other modalities from other available single-modal biometric recognition systems via the telecommunication networks by sending instructions.

The request from SModSys1 may comprise at least one match score MatSco1 generated by matching fingerprint data (e.g., feature template extracted from fingerprint image) of an individual newly captured by SModSys1 and fingerprint data of at least one candidate previously enrolled and stored in a data storage accessible by SModSys1. The request may also contains a quality value Q1 associated with the match score MatSco1. The quality value reflects the quality of the captured biometric data. Alternatively, the request may not comprise the quality value.

Similarly, the request from SModSys2 may comprise at least one match score MatSco2, with or without a quality value Q2, generated by matching facial data (e.g., feature template extracted from facial image) of an individual newly captured by SModSys2 and facial data of at least one candidate previously enrolled and stored in a data storage accessible by SModSys2.

Alternatively, the requests may comprise rank lists RanLis1, RanLis2 instead of match scores, the rank lists each listing a number of ranked candidates respectively generated by SModSys1 and SModSys2 by matching the biometric data (e.g., fingerprint features, facial features) of the individual with pre-enrolled biometric data of the candidates. In each rank list, the candidate of the top position may be suggested as the match of the individual, for example.

Optionally, the fusion controller FC may verify 308a the validity of the received one or more requests. For example, it may unpack a data package comprised in the requests into three types of data, i.e., the match scores (or the match ranks), the biometric data quality metrics, and the fusion request Freq, check whether the data is complete, and repack the data into a message M. The fusion controller FC sends 309 this message M to the fusion engine FE.

In a second alternative example, the fusion phase starts when the fusion controller FC receives 307b a fusion request from an operator though fusion controller APIs. The fusion request comprises match results (e.g., match scores, rank lists) with or without quality values from the multiple single-modal biometric recognition systems. The fusion controller FC generates a message M by including the fusion request FReq, the match results of different biometric modalities BMod1, BMod2, . . . , BModN possibly with the associated quality values, and sends 309 the message M to the fusion engine FE.

The fusion engine FE receives 310 the message M from the fusion controller FC to obtain the fusion request FReq, the match results of different biometric modalities BMod1, BMod2, . . . , BModN, with or without the associated quality values Q1, Q2, . . . , QN.

Optionally, the fusion engine FE identifies 311 a fusion type for the fusion process to be performed according to an indication comprised in the fusion request FReq. For example, whether it is a score-level fusion, or a rank-level fusion. Alternatively, the fusion engine FE identifies 311 the fusion type according to the type of the match results obtained from the message M. In this case, if the match results from the different single-modal biometric recognition systems have different types, for example, match scores between the individual and several candidates from the fingerprint recognition system and a rank list of several candidates from the facial recognition system, the fusion engine FE is able to transform the fingerprint match scores into a rank list, and decide to perform a rank-level fusion using the transformed fingerprint rank list and the facial rank list. This is quite useful in a situation that match scores are unavailable for some biometric modalities (e.g., the facial modality).

According to the identified type of fusion, the fusion engine starts the corresponding fusion processing.

We will discuss first the score fusion process, which is exemplarily illustrated by steps 312*a* to 415*a*. Then we discuss the rank fusion process from steps 314*b* to 315*b*.

In the score fusion process, the fusion engine FE may optionally normalize 312*a* respectively the multiple single-modal matching scores MatSco1, MatSco2, . . . , MatScoN into unified representations of scale. Similarly, the fusion engine FE may optionally normalize 313*a* the biometric quality values Q1, Q2, . . . , QN if it receives the quality values. In this example, we assume that the fusion engine receives the quality values.

As extracting biometric feature templates and scoring the matching pairs by the single-modal biometric recognition systems are vendor-specific and modality-dependent, dissimilarities between the matching scores from different matching engines of the single-modal biometric recognition systems are expected. Different matchers use different match score scales, for example.

The same issue happens to the biometric data quality metrics as there is no standard representation followed by all the vendors and modalities.

So, score normalization as well as the quality metric normalization need to be done in this situation, where the matching scores and quality values returned from different matchers are transformed into the common domain respectively.

For example, a tanh-estimator normalization method (or algorithm) may be adopted to normalize each of the match scores MSco1, MSco2, . . . , MScoN. There are two advantages of this method. The first one is the robustness, i.e., the algorithm is less likely to be influenced by the data distribution outlier. The data distribution outlier means the data points that differ significantly from other, i.e., the data points that don't reflect the estimated distribution. The second one is the efficiency, i.e., the estimated distribution parameters (e.g., $\mu(S_G)$ and $\sigma(S_G)$ as to be further described hereinafter) are close to the true values as much as possible. Other normalization methods may also be adopted such as Min-Max normalization and Z-score normalization, etc.

By using the tanh-estimator approach, the normalized score $s_{norm}$ is calculated as:

$$s_{norm} = \frac{1}{2}\left\{ \tanh\left( 0.01\left( \frac{s - \mu(S_G)}{\sigma(S_G)} \right) \right) + 1 \right\}$$

where:

s is the original score of a certain biometric modality (e.g., the original fingerprint match score MatSco1, the original facial match score MatSco2, etc.).

$S_G$ is a set of all genuine scores of a training sample set of the certain biometric modality. A training sample set is a set of biometric data pairs of multiple individuals, each pair comprising two biometric data (e.g., newly captured and previously enrolled, or captured twice in the objective of training) obtained from a same individual. A genuine score is a match score between the two biometric data of the same individual. An imposter score is a match score between biometric data of two different individuals. The training sample sets TSet1, TSet2, . . . , TSetN of different biometric modalities BMod1, BMod2, BModN may be stored in the database DB accessible by the training engine TE.

$\mu(S_G)$ is a mean of $S_G$ and $\sigma(S_G)$ is a standard deviation of $S_G$.

The statistics of the genuine scores distributions $\mu(S_G)$ and $\sigma(S_G)$ are estimated from both the known genuine and impostor scores by using Hampel estimators. This method is adaptive to the distribution of genuine and impostor scores and provides more flexibility for dynamic fusion rules.

For the normalization of biometric data quality metrics, a Min-Max normalization approach may be used as an example. Other normalization methods such as z-score and tanh-estimator normalization . . . may also be adopted.

$$q_{norm} = \frac{q - \text{Min}(Q)}{\text{Max}(Q) - \text{Min}(Q)}, Q = q_1, q_2, \ldots, q_N$$

Where:

q is the original quality value (e.g., Q1 for the original fingerprint quality value, Q2 for the original facial quality value).

$q_{norm}$ is the normalized quality value (e.g., NQ1 for the normalized fingerprint quality value, NQ2 for the normalized facial quality value).

Assuming we have totally N quality values denoted as $Q=q_1, q_2, \ldots, q_N$, Max(Q) and Min(Q) are the maximum and minimum values in Q respectively.

The quality normalization process is needed when there is no standard form of representation of different types (or modalities) of the biometric data from various vendors, in order to convert different quality metrics into a uniform scale.

In the example of FIG. 3, after obtaining 312*a*, 313*a* the normalized matching scores and the quality values, the fusion engine FE retrieves 314*a* from the database DB a fusion model FM corresponding to the score-level fusion and the parameters of this fusion model FM that have been optimized by the training engine TE and updated in the database DB.

Preferably, the invention proposes to use a probability-ratio model as the fusion model FM for the score-level fusion. This probability-ratio model is most advantageous as it requires no extensive parameter selection, is adaptive and robust to the typical long tail biometric score densities, and can also incorporate quality metrics into the system framework.

Generally, the probability-ratio fusion model is to fuse the match scores MatSco1, MatSco2, . . . , MatScoN from the different modalities BMod1, BMod2, . . . , BModN, when considering the associated quality values Q1, Q2, . . . , QN, into a probability ratio $$\frac{s_{gen}(X, Q)}{s_{imp}(X, Q)}$$

as a final fused score FSco. The probability ratio is a ratio of a probability $s_{gen}$ (X, Q) that the match scores are genuine scores, called genuine score probability, to a probability $s_{imp}$ (X, Q) that the match scores are imposter scores, called imposter score probability. Since a genuine score means a match score between the two biometric data of the same individual, and an imposter score means a match score between biometric data of two different individuals, the probability ratio can be understood to be a ratio of a probability that the individual matches the candidate to a probability that the individual does not match the candidate.

In order to obtain the genuine score probability and the imposter score probability, the finite Gaussian Mixture Models (GMMs) may be used to formulate probability distributions (or densities) respectively for the genuine scores and the impostor scores that are known from the training sample sets. To help understanding, Hampel estimators as mentioned above are used for the normalization, i.e., calculating of the mean and the standard deviation by eliminating the outlier without any assumptions of the shape of the distribution. The GMMs are applied to the vector of scores from multiple modalities. They are to describe the detailed distribution of the data, so that the parameters estimated here can be used directly for fusion purposes.

The finite Gaussian Mixture Models overcome the difficulties commonly found in other distribution estimation models such as, high complexity, not being adaptive to noise, complex model parameter selections, etc. When a sufficient number of training samples is provided, the GMMs can accurately reflect the true distributions of the genuine and impostor match scores. A k-variant Gaussian distribution is described as:

$$\phi^k\left(X; \mu, \sum\right) = \frac{1}{(2\pi)^{\frac{k}{2}}|\sum|^{\frac{1}{2}}} \exp\left(-\frac{(X-\mu)^T(X-\mu)}{2\sum}\right)$$

where:

X is a vector of the match scores (e.g., MatSco1, MatSco2, . . . , MatScoN) from N biometric modalities $X = x_1, x_2, \ldots, x_N$).

$\mu$ is a vector of means of the genuine/imposter scores known from the training sample sets from N biometric modalities $\mu = (\mu_1, \mu_2, \ldots, \mu_N)$.

$\Sigma$ is a N*N covariance matrix of the genuine/imposter scores known from the training sample sets from N biometric modalities.

k is an empirical parameter which may be set or learned from training.

Since the quality of biometric data has an impact on the accuracy of matching, it is advantageous to incorporate, in addition to score densities, the qualities of the biometric data into the score fusion. Such types of the joint estimation will lead to the improvement of the overall accuracy and performance of the system.

The genuine score probability and the imposter score probability are calculated based on the above k-variant Gaussian distribution $\phi^k(X; \mu, \Sigma)$ by taking into account the qualities, as below.

$$s_{gen}(X, Q) = \sum_{i=1}^{M_{gen}} p_{gen,i} \phi^k\left(X, Q; \mu_{gen,i}, \sum_{gen,i}\right)$$

$$s_{imp}(X, Q) = \sum_{i=1}^{M_{imp}} p_{imp,i} \phi^k\left(X, Q; \mu_{imp,i}, \sum_{imp,i}\right)$$

where:

$s_{gen}$ is a joint probability of X and Q as genuine score.

$s_{imp}$ is a joint probability of X and Q as imposter score.

$M_{gen}$ and $M_{imp}$ are the number of mixture components of GMMgen and GMMimp respectively (the $M_{gen}$ and $M_{imp}$ are the same because they both refer to the number of modalities).

$p_{gen,i}$ and $p_{imp,i}$ are weights of $i^{th}$ components of GMMgen and GMMimp respectively.

$\mu_{gen,i}$ is a vector of means of all genuine match scores of the training sample sets of N biometric modalities from $i^{th}$ components of GMMgen.

$\mu_{imp,i}$ is a vectors of means of all imposter match scores of the training sample sets of N biometric modalities from $i^{th}$ components of GMMimp.

$\Sigma_{gen,i}$ is a N*N covariance matrix of all genuine match scores of the training sample sets of N biometric modalities from $i^{th}$ components of GMMgen.

$\Sigma_{imp,i}$ is a N*N covariance matrix of all imposter match scores of the training sample sets of N biometric modalities from $i^{th}$ components of GMMimp.

At least one or some or all of the parameters $M_{gen}$, $M_{imp}$, $p_{gen,i}$, $p_{imp,i}$, $\mu_{gen,i}$, $\mu_{imp,i}$, $\Sigma_{gen,i}$, $\Sigma_{imp,i}$ of the probability-ratio model can be obtained (or optimized) by the training engine TE based on machine learning approaches during the training phase. For example, a Component-Wise EM for Mixture (CEMM) algorithm may be used as the machine learning approach. The CEMM is proposed as this algorithm updates the parameters sequentially rather than simultaneously, which helps the estimation converge faster than the traditional EM algorithms. Other methods could be, Space-Alternating Generalized EM (SAGE), and SAGE with Constrained Newton Method (CNM).

The fusion engine FE retrieves 314a from the database DB the probability-ratio fusion model FM with its optimized parameters $M_{gen}$, $M_{imp}$, $p_{gen,i}$, $p_{imp,i}$, $\mu_{gen,i}$, $\mu_{imp,i}$, $\Sigma_{gen,i}$, $\Sigma_{imp,i}$. Then the fusion engine FE calculates 315a the probability ratio $$\frac{s_{gen}(X, Q)}{s_{imp}(X, Q)}$$

as the final fused score FSco.

For verifying whether the individual matches (i.e., is the same person as) the candidate, the probability ratio $$\frac{s_{gen}(X, Q)}{s_{imp}(X, Q)}$$

may be compared with a pre-set threshold Th. If the probability ratio is not less than the threshold, it is decided that the individual matches the candidate. Otherwise, it is decided that the individual does not match the candidate.

The threshold Th may be obtained in the training process by giving a specified false acceptance rate FAR value while minimizing a false reject rate FRR.

In practice, given enough training data, the Probability-Ratio based approach will achieve improved performance, as the learning of the GMM becomes more accurate. Practically, since we can assume that different modalities are independent, and the matching score distributions are identical for all identities, in case there are missing matching scores and/or quality values from certain modalities, we can still estimate joint probabilities by setting the missing probability ratio to 1 without changing any decision rules. Missing probability ratio here refers to one from a single modality. Setting it to 1 would not change the result of joint probability from multiple modalities because of the nature of the multiplication.

Particularly, the modality weighting factors are actually embedded into this fusion frameworks in the form of the numbers and weights of the GMM's components. One component corresponds to one modality. During the training stage, by giving proper initialized parameters, weighting factors (i.e., the numbers and weights of the GMM's components) will be learned automatically from the training sample set data from all modalities. With the system running over the time, the re-training of the model parameters can be done with richer data in order to reach the better performance.

Now we turn to the rank-level fusion process from steps 314*b* to 315*b*. This type of fusion is needed in some extreme cases, e.g., some special single-modal biometric recognition systems, where there is no match score available at the fusion stage rather than the ranking lists from multiple biometric modalities for the identity candidates. In this situation, the rank-level fusion approach may be used to improve the matching performance.

Similar to the machine learning based score fusion approach above, a machine-learning based ranking fusion method may be used within the fusion system framework because a trainable rank-level fusion approach is postulated to outperform a simple rule-based fusion approach when the performance of the underlying single-modal biometric matchers are different from each other. This is because the trained weights can be used to adjust the contribution of each biometric matcher (or modality) to produce the final combined rank list.

In the example of FIG. 3, when the fusion engine identifies that the type of fusion is a rank-level fusion, for example, if the fusion request FReq indicates so, or if the fusion engine FE detect that the received match results are rank lists.

In this document, a rank list is a list of ranked candidates having biometric data stored in the database and compared with the biometric data captured from the individual. Generally, the higher the ranking position of a candidate is, the greater the probability of matching the individual is.

Preferably, the fusion model FM used for the rank-level fusion is a weighted voting model. This model consolidate the ranks from the multiple different modalities. Trainable parameters of the weighted voting model are voting weights of the different modalities. In an example, the model can be formulated as:

$$C(x) = \sum_{i=1}^{N} \beta_i v_i(x)$$

Where:

N represents the number of modalities (e.g., BMod1, BMod2, . . . , BModN) in the given multimodal biometric fusion system.

$v_i(x)$ represents the vote of the candidate (or candidate identity) x in the database from the $i^{th}$ modality. Given the length of the candidate list L, rank-1 candidate have L votes, rank-2 candidate have L−1 votes, and so on.

$\beta_i$ is the voting weight of the $i^{th}$ modality.

C(x) is the total votes from all modalities, which means for every possible candidate, the votes from all the modalities are added, the larger C(x) the value is, the higher rank the candidate has in the fused candidate list.

In an example, the voting weight of the modalities may be learned (or optimized) by the training engine TE by using a logistic regression algorithm from the training sample sets during the training phase. For example, in the training phase, given that there are N modalities, then for each training candidate x, there will be N votes as $V(x)=(v_1(x), v_2(x), . . . , v_N(x))$. Assuming that a certain candidate x has the highest number of votes $v_i(x)$ from a certain modality (e.g., if it ranks as the top candidate by the $i^{th}$ modality, $v_i(x)=L$), the probability that this candidate matches the individual given all the votes is denoted as p(V):

$$p(V) = \frac{\exp(\alpha + \beta_1 v_1 + \beta_2 v_2 + \cdots + \beta_N v_N)}{1 + \exp(\alpha + \beta_1 v_1 + \beta_2 v_2 + \cdots + \beta_N v_N)}$$

Then the logistic response function can be represented by:

$$\log \frac{p(V)}{1 - p(V)} = (\alpha + \beta_1 v_1 + \beta_2 v_2 + \cdots + \beta_N v_N)$$

where $(\alpha, \beta_1, \beta_2, . . . , \beta_N)$ are the parameters. $\alpha$ is a regulator linked with the probability calculation. $\beta_1, \beta_2, . . . , \beta_N$ are the weights of all the modalities that can be optimized by the training engine TE using, for example, maximum likelihood or weighted least-square approaches based on data of the training sample sets.

The fusion engine FE retrieves 314*b* from the database DB the weighted voting model FM with its optimized parameters $(\beta_1, \beta_2, . . . , \beta_N)$. Then the fusion engine FE calculates 315*b* calculates, for each candidate of the rank lists, total votes from the multiple different biometric modalities BMod1, BMod2, . . . , BModN, and obtains a fused rank list, as the final fused match result, based on the total votes of each candidate.

The final fused match result (e.g., the fused score, the fused rank list) may be sent by the fusion engine FE back to the fusion controller FC as a response to the fusion request. In case where the fusion request is sent by one or more of the single-modal biometric recognition systems, the fused match result is transmitted by the fusion controller FC to the requesting single-modal biometric recognition system(s) via the telecommunication network.

The final fused match result may be stored in the database DB so that the evaluation engine EE may track historical fused match results to evaluate fusion performance metrics for the fusion system.

The evaluation engine EE may be configured to track the fusion results and the associated information (e.g., Decisions, match scores, image quality metrics) of the operations performed by the fusion engine FE, evaluate the newly received training samples, and evaluate if a training criteria is suggested. Such a criteria may be that, for example, the FRR of the system is above a pre-set threshold at a certain FAR. When the criteria is met, the evaluation engine EE triggers the fusion engine FE to start the online training process on the training engine TE.

As the distribution of the biometric samples change over time, the training engine TE is able to automatically adapt the fusion engine FE configuration to optimize biometric match accuracy performance.

The performance reporting dashboard (or display interface) DI provides an interface to the user (e.g., operator), from which the fusion system configuration and performance metrics are updated periodically. By pulling the information from both the display interface DI and local database, users can easily master the both current and historical system configurations and running status in order to make necessary system maintenance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for recognizing an individual by fusing a first match result (MatSco1; RanLisi) generated by a first single-modal biometric recognition system (SModSys1) of a first biometric modality (BMod1) and at least one second match result (MatSco2, . . . , MatScoN; RanLis2, . . . , RanLisN) generated by at least one second single-modal biometric recognition system (SModSys2, . . . , SModSysN) of a second biometric modality (BMod2, . . . , BModN) into a fused match result (FSco; FRan), the method being suitable to be implemented by a multimodal biometric fusion system (FSys) and said method comprising: by a training engine (TE):

receiving a training request (TReq) for optimizing parameters of a fusion model (FM) to achieve a target performance metric (FARt);

retrieving, from a database (DB) of the fusion system, the fusion model (FM), initial parameters (ParInt) of the fusion model (FM), a training sample set (TSet1) of the first biometric modality (BMod1) and at least one training sample set (TSet2, . . . , TSetN) of the at least one second biometric modality (BMod2, . . . , BModN);

performing a machine learning based training on the retrieved data (FM, ParInt, TSet1, TSet2, . . . , TSetN) to obtain optimized parameters (ParOpt) meeting the target performance metric (FARt);

updating the parameters of the fusion model (FMt) with the optimized parameters (ParOpt) in the database (DB);

by a fusion engine (FE) of the fusion system:

receiving, from a fusion controller of the fusion system, a message (M) comprising a fusion request (FReq), the first match result (MatSco1; RanLis1) generated by a first single-modal biometric recognition system (SModSvsI) of a first biometric modality (BModI), and the at least one second match result (MatSco2, . . . , MatScoN; RanLis2, . . . , RanLisN) generated by at least one second single-modal biometric recognition system (SModSys2, . . . , SModSvsN) of a second biometric modality (BMod2, . . . , BModN);

obtaining from the message (M) the first match result (MatSco1; RanLisi) and the at least one second match result (MatSco2, . . . , MatScoN; RanLis2, . . . , RanLisN);

retrieving, from the database (DB), the optimized parameters (ParOpt) of the fusion model (FM);

applying the fusion model (FM), with the optimized parameters (ParOpt), to the first match result (MatSco1; RanLisi) and the at least one second match result (MatSco2, . . . , MatScoN; RanLis2, . . . , RanLisN) to calculate a fused match result (FSco; FRanLis) for recognizing the individual, evaluating by an evaluation engine (EE) of the fusion system a performance metric (FAR) based on a set of multimodal biometric fused match results (FSco) that have been generated by the fusion engine (FE), comparing the evaluated performance metric (FAR) with a target performance metric (FARt) to trigger the sending of the training request (TRea) to the training engine (TE).

2. The method according to claim 1, wherein the first match result (MatSco1; RanLis1) and the at least one second match result (MatSco2, . . . , MatScoN; RanLis2, . . . , RanLisN) are matching scores (MatSco1, MatSco2, . . . , MatScoN), the matching score being a score obtained by matching biometric data captured from the individual and biometric data enrolled from a certain candidate and stored in the database (DB).

3. The method according to claim 2, further comprising:

before applying the fusion model (FM), for each (MatSco1) of the first single-modal biometric matching score and the at least one second single-modal biometric matching score, applying a tanh-estimator to a ratio of a difference between the original single-modal biometric matching score (MatSco1) and a mean of all genuine scores of a training sample set (TSet1) to the standard deviation of all the genuine scores of the training sample set (TSet1) to calculate a normalized matching score (NMatSco1), the training sample set (TSet1) having the same biometric modality (BMod1) as the original single-modal biometric matching score (MatSco1);

wherein the first normalized matching score (NMatSco1) and the at least one second normalized matching score (NMatSco2, . . . , NMatScoN) instead of the original matching scores are used to calculate the fused match result (FSco).

4. The method according to claim 2, wherein the message (M) further comprises a first quality value (Q1) associated with the first single-modal biometric matching score (MatSco1), at least one second quality value (Q2, . . . , QN) respectively associated with the at least one second single-modal biometric matching score (MatSco2, . . . , MatScoN);

wherein the fused match result (FSco) is calculated by further taking into account the first quality value (Q1) and the second quality values (Q2, . . . , QN).

5. The method according to claim 4, further comprising:

before applying the fusion model (FM), for each (Q1) of the first quality value and the at least one second quality value, calculating a normalized quality value (NQ1) by applying a Min-Max normalization approach to the original quality value (Q1), the minimum and the maximum of all original quality values (Q1, Q2, . . . , QN);

wherein normalized quality values (NQ1, NQ2, . . . , NON) instead of the original quality values are used to calculate the fused match result (FSco).

6. The method according to claim 4, wherein the fusion model (FM) applied by the fusion engine (FE) is a prob-ability-ratio model which calculates a ratio of a probability (Sgen) that the individual matches a candidate, called genu-ine score probability, to a probability (Simp) that the indi-vidual is not match a candidate, called imposter score probability, the probability ratio being the fused match result (FSco);

wherein the genuine score probability (Sgen) and the imposter score probability (Simp) are respectively cal-culated according to a first finite Gaussian Mixture Model (GMMgen) and a second finite Gaussian Mix-ture Model (GMMimp) by taking into account:

the single-modal biometric matching scores (MatSco1, MatSco2, . . . , MatScoN; NMatSco1, NMatSco2, . . . , NMatScoN)) and quality values (Q1, Q2, . . . , QN; NQ1, NQ2, . . . , NON) as variables;

a number of mixture components of the corresponding finite Gaussian Mixture Model (GMMgen, GMMimp), a weight of each mixture component, a vector of means of scores of the training sample sets (TSet1, TSet2, . . . , TSetN) for each mixture component, a covariance matrix of scores obtained from the training sample sets (TSet1, TSet2, . . . , TSetN) for each mixture component, as parameters.

7. The method according to claim 6, wherein the param-eters are learned by the training engine using a Component-Wise EM for Mixture (CEMM) algorithm from the training sample sets (TSet1, TSet2, . . . , TSet3).

8. The method according to claim 1, wherein the first match result and the at least one second match result are rank lists (RanLis1, RanLis2, . . . , RanLisN), the rank list being a list of ranked candidates having biometric data stored in the database (DB) and compared with the biometric data captured from the individual.

9. The method according to claim 8, wherein the fusion model (FM) applied by the fusion engine (FE) is a weighted voting model which calculates, for each candidate of the rank lists, total votes from the first and the at least one second biometric modalities (BMod1, BMod2, . . . , BModN), and obtains a fused rank list based on the total votes of each candidate, wherein the biometric modalities (BMod1, BMod2, . . . , BModN) have voting weights as parameters of the fusion model.

10. The method according to claim 9, wherein the param-eters are learned by the training engine using a logistic regression algorithm from the training sample sets (TSet1, TSet2, . . . , TSet3).

11. The method according to claim 9, wherein the mes-sage (M) is generated and sent by the fusion controller (FC) in response to a request comprising the first match result (MatSco1; RanLis1) received by the fusion controller (FC) from the first single-modal biometric recognition system (SModSys1) via a telecommunication network, and wherein the fused match result (FSco; FRanLis) is sent by the fusion controller to the first single-modal biometric recognition system (SModSys1) via the telecommunication network.

12. The method according to claim 11, further compris-ing:

before sending the message (M) to the fusion engine (FE), verifying by the fusion controller (FC) whether the request from the first single-modal biometric recogni-tion system (SModSys1) is valid;

generating the message (M) if the request is valid.

13. The method according to claim 9, wherein the mes-sage (M) is generated and sent by the fusion controller (FC) in response to an instruction received by the fusion control-ler (FC) from an operator.

14. The method according to claim 13, the method further comprising: detecting a single-modal biometric recognition system of a new biometric modality and/or a new vendor to trigger the sending of the training request (TReq) to the training engine (TE).

15. The method according to claim 9, further comprising: displaying the evaluated performance metric and historical performance metrics on a screen of the fusion system for an operator to review.

16. The method according to claim 9, wherein the evalu-ated performance metric is chosen from one or more of: a false acceptance rate FAR, a false reject rate FRR, and a receiver operating characteristic curve ROC.

17. A multimodal biometric fusion system (FSys) com-prising a processor of a training engine (TE) of the fusion system:

receiving a training request (TReq) for optimizing param-eters of a fusion model (FM) to achieve a target performance metric (FARt);

retrieving, from a database (DB) of the fusion system, the fusion model (FM), initial parameters (ParInt) of the fusion model (FM), a training sample set (TSet1) of the first biometric modality (BMod1) and at least one training sample set (TSet2, . . . , TSetN) of the at least one second biometric modality (BMod2, . . . , BModN);

performing a machine learning based training on the retrieved data (FM, ParInt, TSet1, TSet2, . . . , TSetN) to obtain optimized parameters (ParOpt) meeting the target performance metric (FARt);

updating the parameters of the fusion model (FMt) with the optimized parameters (ParOpt) in the database (DB);

of a fusion engine (FE) of the fusion system:

receiving, from a fusion controller of the fusion system, a message (M) comprising a fusion request (FReq), the first match result (MatSco1; RanLis1) generated by a first single-modal biometric recognition system (SModSys1) of a first biometric modality (BMod1), and at least one second match result (MatSco2, . . . , MatScoN; RanLis2, . . . , RanLisN) generated by at least one second single-modal bio-metric recognition system (SModSys2, . . . , SMod-SysN) of a second biometric modality (BMod2, . . . , BModN);

obtaining from the message (M) the first match result (MatSco1; RanLis1) and the at least one second match result (MatSco2, . . . , MatScoN; RanLis2, . . . , RanLisN);

retrieving, from the database (DB), the optimized parameters (ParOpt) of the fusion model (FM);

applying the fusion model (FM), with the optimized parameters (ParOpt), to the first match result (MatSco1; RanLis1) and the at least one second match result (MatSco2, . . . , MatScoN; RanLis2, . . . , RanLisN) to calculate a fused match result (FSco; FRanLis) for recognizing the individual, evaluating by an evaluation engine (EE) of the fusion system a performance metric (FAR) based on a set of multimodal biometric fused match results (FSco) that have been generated by the fusion engine (FE), comparing the evaluated performance metric (FAR) with a target performance metric (FARt) to trigger the sending of the training request (TReq) to the training engine (TE).

18. The multimodal biometric fusion system (FSys) of claim 17, comprises a computer program comprising instructions which, when the computer program is executed by the processor of the multimodal biometric fusion system (FSys), cause the multimodal biometric fusion system to recognize an individual by fusing a first match result (MatSco1; RanLis1) generated by a first single-modal biometric recognition system (SModSys1) of a first biometric modality (BMod1) and at least one second match result (MatSco2, . . . , MatScoN; RanLis2, . . . , RanLisN) generated by at least one second single-modal biometric recognition system (SModSys2, . . . , SModSysN) of a second biometric modality (BMod2, . . . , BModN) into a fused match result (FSco; FRan).

* * * * *